March 27, 1956     T. PETERSEN     2,739,382

PIPE CUTTER

Filed May 28, 1954

INVENTOR.
Thorwald Petersen
BY
Ralph Hammar

United States Patent Office 2,739,382
Patented Mar. 27, 1956

2,739,382
PIPE CUTTER

Thorvald Petersen, Erie, Pa., assignor to Reed Manufacturing Company, Erie, Pa., a corporation of Pennsylvania Application May 28, 1954, Serial No. 433,116

1 Claim. (Cl. 30—102)

This invention is a pipe cutter for pipe such as asbestos reinforced cement for which the cutting wheels used on metal pipe are not adaptable. By substituting in the usual metal pipe cutter wheels of saw tooth configuration with the sides of the teeth provided with sharp cutting edges, the cement pipe is readily cut. As the teeth enter the wall of the pipe, the pitch of the indentations changes resulting in a rotation of the wheels relative to the pipe which has a cutting or milling action actually removing material and cutting a slot in the wall of the pipe. This cutting action is different from the cutting of metal pipe where no metal is removed by the wheel but merely rolls a groove in the pipe by displacing metal.

Figure 1:
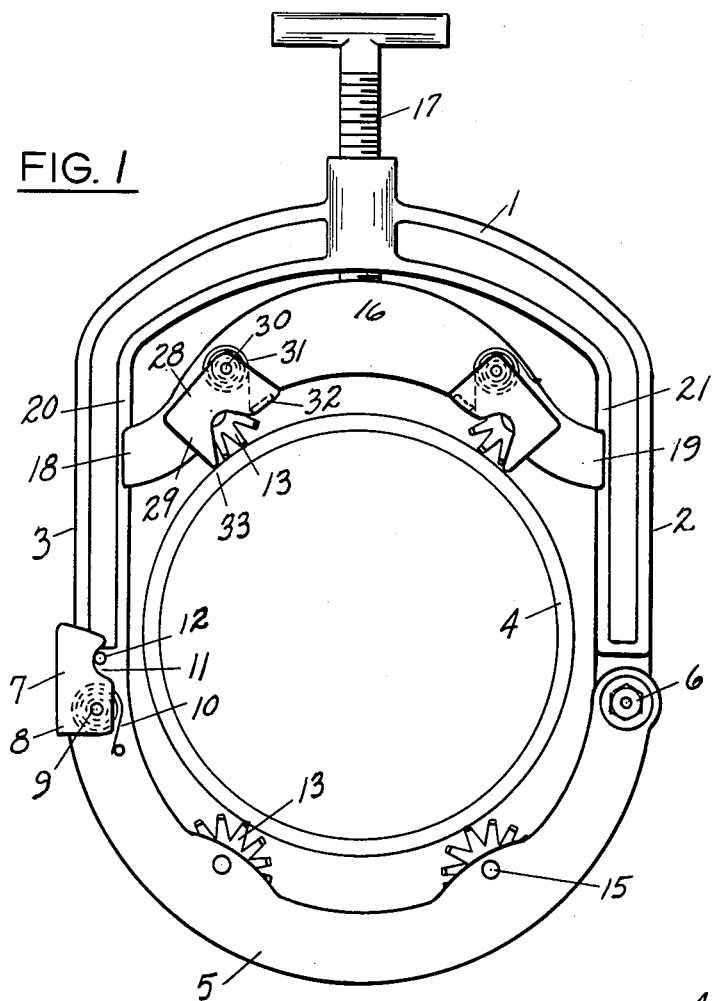
Figure 3:
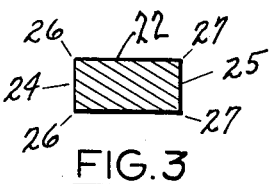
Figure 4:
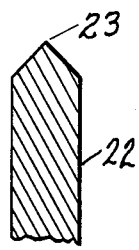
Figure 2:
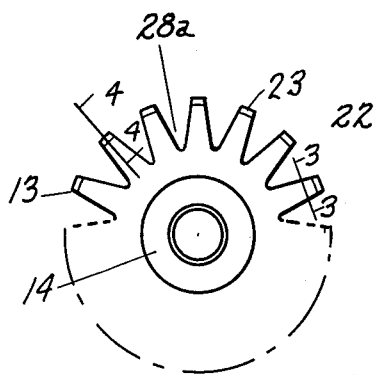
Figure 5:
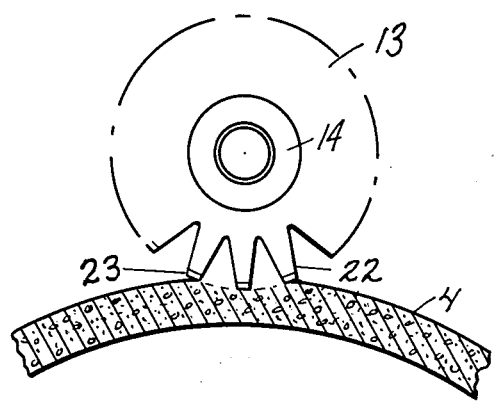

In the drawing, Fig. 1 is an end elevation of a four wheel pipe cutter, Fig. 2 is an end elevation of one of the pipe cutter wheels, Figs. 3 and 4 are sections on the correspondingly numbered lines of Fig. 2, and Fig. 5 is a view diagrammatically illustrating the action of the cutting wheels in cutting asbestos reinforced cement pipe and the like.

The invention is shown applied to a four wheel cutter used for large diameter pipe. The cutter has a yoke-shaped frame comprising an upper U-shaped section 1 with depending arms 2 and 3 straddling the pipe 4 and a lower semicircular section 5 having one end hinged at 6 to one of the arms 2 and having the other end secured to the other of the arms 3 by a catch 7 of channel section with flanges 8 straddling the other end of the lower frame section and pivoted thereto at 9. A coil spring 10 urges the catch in a counter-clockwise direction as viewed in Fig. 1 bringing notches 11 in the flanges 8 into locking engagement with a pin 12 fixed in the lower end of the arm 3. As the lower frame section is swung up into place, the catch automatically engages the pin and latches the frame sections together.

The lower frame section 5 is of channel section, as shown in Fig. 2, and at points substantially 90 degrees apart carries two cutting wheels 13 each having a hub 14 journaled on a pin 15 extending across the side walls of the lower frame section.

On the upper frame member 1 is a semicircular crosshead 16 which is moved up and down by the usual pressure screw 17. The crosshead 16 is of channel cross section and has ends 18 and 19 straddling guideways 20 and 21 respectively on the depending arms 3 and 2 of the upper frame member. The crosshead 16 likewise carries cutting wheels 13 of the same construction as the cutting wheels in the lower frame member 5 and likewise spaced to engage the pipe 4 at points spaced approximately 90 degrees apart.

As shown more clearly in Figs. 2, 3 and 4, the cutting wheels 13 are of saw tooth configuration having radial teeth 22 each having circumferentially extending beveled tips 23 and front and back sides 24 and 25 having sharp cutting edges 26 and 27 at the corner edges. As shown in Fig. 4, the teeth 22 are of substantially uniform thickness. There are V-shaped spaces 28a between the teeth which are preferably larger than the teeth so as to provide clearance for the material removed during the cutting.

When the lower frame 5 is latched in place around the pipe 4 the wheels 13 initially are not in cutting engagement with the pipe. As the screw 17 is threaded to move the crosshead downward, the wheels are brought into cutting engagement. It is important that all of the wheels be in the same plane and at right angles to the pipe as otherwise a skew cut will be made. This is accomplished by a pair of guide brackets 28 described in application Serial No. 327,105 filed December 20, 1952, each having spaced arms 29 straddling the crosshead 16. The guide brackets are most effective when spaced apart 90° but the angular spacing must be an acute angle so the brackets have the centering function of a V. The guide brackets 28 are pivoted on pins 30 and are biased downward by coil springs 31 to an extent limited by stops 32. Before the upper cutting wheels 13 are brought into cutting engagement with the pipe the tips 33 of the spaced arms 29 of the guide brackets 28 will project slightly inward of the cutting wheels 13 and as the crosshead 16 is lowered, the tips 33 of the guide brackets first contact the outer surface of the pipe 4. Because the tips 33 of the guide brackets are spaced on each side of the upper cutting wheels 13 the user knows that when all of the tips 33 are brought into contact with the outer surface of the pipe 4, the pipe cutter is positively aligned at right angles to the axis of the pipe. Upon further tightening of the pressure screw 17, the upper wheels 13 are lowered into cutting engagement with the pipe 4 and the guide brackets ride on the outer surface of the pipe. Of course, if the upper wheels are aligned at right angles to the axis of the pipe, the lower cutting wheels will likewise be similarly aligned and all of the wheels will track and will cut the pipe at right angles.

The action of the cutting wheels in cutting the cement pipe is shown in Fig. 5. The cutter can be operated by rotating continuously about the pipe or by oscillating the cutter through an arc of such extent that the cutter wheels traverse the entire circumference of the pipe. As the cutting wheels 13 are initially brought into contact with the pipe, the bevel pointed tips 23 make indentations in the surface of the pipe having the same spacing as the spacing between the teeth. However, as the pressure screw 17 is progressively tightened to the teeth in attempting to track in the previously formed indentations the wheels must rotate relative to the pipe and this relative rotation causes the sharp cutting edges 26 and 27 to actually cut away the material of the pipe thereby producing a milled or sawed slot which upon reaching a sufficient depth or penetration into the side wall of the pipe 4 causes cleavage of the pipe in the plane of the slot. Proper cutting action requires sharp cutting edges 26 and 27. The bevel points 23 are shaped so as to provide sufficient rigidity and strength preventing fracture upon the initial penetration. The larger clearance spaces 28a between the teeth are desirable to provide space for removal of the material cut away by the cutting edges 26 and 27.

This pipe cutter is not useful in metal pipe but is useful in pipes of brittle material such as asbestos reinforced cement which cannot be cut with the usual pipe cutters used for metal pipe.

What is claimed as new is:

In a wheel type pipe cutter for asbestos reinforced cement pipe and the like, a frame including wheel supporting parts movable relative to each other, pressure exerting means for effecting said relative movement of the wheel supporting parts, a wheel journaled in one of the wheel supporting parts for free rotation solely by contact between its periphery and a pipe, said wheel having a toothed periphery with the sides of the teeth having sharp corners in section transverse to the length of the teeth providing cutting edges which as the teeth are pressed into the pipe cut away the wall of the pipe as the wheel is rotated relative to the pipe by the teeth trying to follow indentations previously made by the teeth, and the tips of the teeth being beveled to provide a circumferentially extending pointed edge in the plane of the wheel narrower than the body of the teeth, said circumferentially extending edge being pointed in cross-section at right angles to the plane of the wheel and blunt in cross-section in the plane of the wheel.

References Cited in the file of this patent

UNITED STATES PATENTS

| | | |
|---|---|---|
| 691,649 | Michell | Jan. 21, 1902 |
| 857,694 | Wahnsiedler | June 25, 1907 |
| 1,047,280 | Oster | Dec. 17, 1912 |
| 1,065,528 | Holland | June 24, 1913 |
| 1,150,220 | Nonneman | Aug. 17, 1915 |
| 1,279,022 | Scott | Sept. 17, 1918 |
| 1,507,969 | Kilgour | Sept. 9, 1924 |
| 1,932,462 | Howlett | Oct. 31, 1933 |
| 2,448,578 | Condon | Sept. 7, 1948 |
| 2,561,484 | Shaw et al. | July 24, 1951 |